May 13, 1941.　　B. C. MOISE　　2,241,517

PIPE CONNECTION

Filed Nov. 9, 1939

Inventor:
BOLTON C. MOISE
by: John E. Jackson
his Attorney.

Patented May 13, 1941

2,241,517

UNITED STATES PATENT OFFICE 2,241,517

PIPE CONNECTION

Bolton C. Moise, Pittsburgh, Pa., assignor to National Tube Company, a corporation of New Jersey Application November 9, 1939, Serial No. 303,688

1 Claim. (Cl. 285—193)

This invention relates to a pipe connection and particularly to an improved threadless pipe connection especially adaptable for composite pipes and method of making the same.

Various methods have been suggested and used for joining composite or lined pipes so that a continuous surface of the metallic lining material is obtained throughout the joint. The method most commonly used is to cut back the end of the lined pipe a distance equal to thickness of the base metal without cutting off the lining material which is then turned up over the cut back end. The ends of the pipes are threaded and screwed into the threaded coupling so that the ends abut each other thereby preventing the fluid being transported in the lined pipes from coming in contact directly with the metal of the coupling. However, to insure the success of such a method, extreme care and precision in the threading of the pipe ends and coupling beyond that which is commercially feasible is essential if the threads are to become seated at the desired point to make a tight joint. Thus, it will be seen that the above procedure is extremely tedious and at times does not provide a satisfactory joint. Moreover, if the lining material is bonded to the base metal, it will be seen that this method cannot be employed.

It has been suggested to join iron or steel pipes by machining the ends of the pipes and the interior of the coupling so as to provide a suitable clearance therebetween of the desired tolerance. In such a connection, an annular shoulder is provided on the interior of the coupling against which the ends of the pipes abut when they are positioned therein so as to prevent the sealing medium from being forced into the interior of the pipes at the joint. If such a connection is used to join pipes lined with a corrosion resisting material, such as copper, a coupling made in such manner has a deleterious effect, as the shoulder being of steel presents a material cathodic to the copper lining causing an electrolytic action to be set up when a fluid is conveyed therethrough which quickly destroys the joint. Thus, it will be seen that such a connection is most unsatisfactory.

In the present invention all the above named disadvantages have been eliminated and there is provided a threadless pipe connection, especially adaptable for lined pipes, in which the sealing medium is prevented from entering the interior of the pipes at the joint, and there is provided an interiorly lined shoulder in the coupling against which the pipes abut when they are positioned therein, thereby preventing the fluid being transported in the pipes from coming in contact with the metallic coupling and attacking the same. In the connection of the present invention the sealing medium is held in position between the ends of the pipes and the coupling and evenly distributed over the telescoped surfaces of the pipes and the coupling by means of capillary action during the joining of the pipes.

Accordingly, it is one of the objects of the present invention to provide an improved threadless connection for lined pipes which is inexpensive and simple in its construction and use and, at the same time, one which will effectively and safely maintain the pipes in connected relation.

It is another object of the invention to provide an improved threadless connection for lined pipes which provides a smooth continuous connection having substantially the same inner diameter throughout the joint.

It is a further object of the present invention to provide an improved method of making a coupling for connecting lined pipes together which is simple and inexpensive in its practice and one which insures a strong and rugged joint when properly made and used.

Various other objects and advantages of this invention will be more apparent in the course of the following specification and will be particularly pointed out in the appended claim.

In the accompanying drawing there is shown, for the purpose of illustration, one embodiment which my invention may assume in practice.

Figure 1:
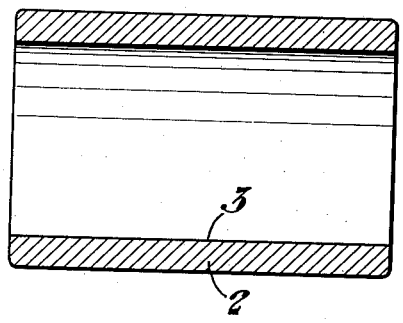
Figure 1 is a longitudinal section through a coupling blank as used in connection with the present invention.
Figure 2:
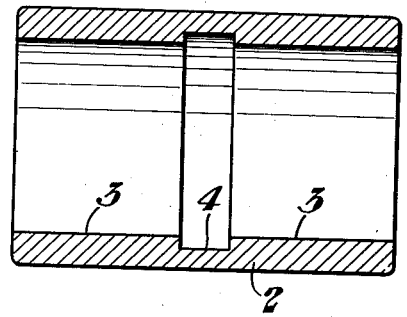
Figure 2 is a similar section of a coupling blank showing a step in making the improved coupling of my invention.
Figure 3:
Figure 3 is a vertical section through the lined annular or ring member to be assembled in the coupling blank.

Referring more particularly to the drawing, the numeral 2 indicates a coupling blank preferably of a ferrous material with the inner walls 3 having been machined to provide a coupling of the required inner diameter and having a smooth surface. The interior of the coupling is preferably machined four thousandths to six thousandths of an inch larger than the pipes or tubular members to be joined so as to provide the proper clearance therebetween when the ends of the pipes and the coupling are telescopically engaged. There is arranged on the interior of the coupling blank 2 and substantially centrally thereof, as shown in Figure 2, an annular groove or recess 4 which is preferably formed as the finishing step of the machining operation.

Figure 6:
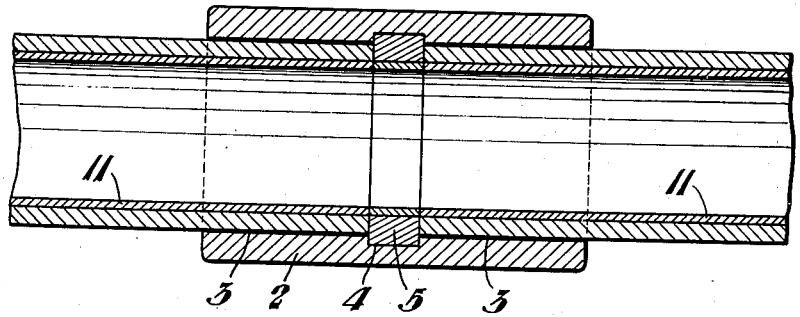

There is provided preferably a split ring or annular member 5 which is adapted to be positioned in the annular groove or recess 4 of the coupling member 2. It will be understood that the ring member 5 is split as at 6, preferably at an angle to the longitudinal axis thereof for the purpose of aiding in positioning the ring member in the coupling. That is, the ring member being inherently resilient is compressed and forced into one end of the coupling and when it is positioned in the annular groove 4 therein it expands to its normal diameter and is securely maintained therein, as shown in Figure 6.

Figure 4:
Figure 4 is an elevation of the annular or ring member.
Figure 5:
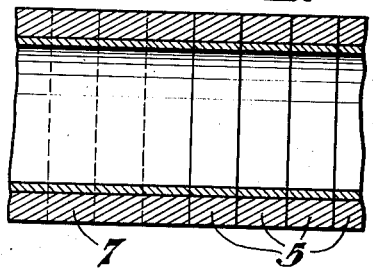
Figure 5 is a longitudinal section through a piece of lined pipe showing how the annular or ring members as shown in Figures 3 and 4 are made; and, Figure 6 is a longitudinal section of the completed coupling and joint showing the annular or ring member assembled in the coupling and the lined pipes assembled therein.

The annular split member or ring 5 may be made in any suitable manner but if the ring is to be used in a coupling for connecting lined pipes which are usually copper lined, the ring members are preferably made by centrifugally lining a length of pipe 7 in the conventional manner, as shown in Figure 5, of the desired outer diameter and wall thickness with the desired lining material arranged therein. This provides an inner coating which is firmly and tenaciously bonded to the base metal of the pipe. The length of pipe 7 is then cut into a number of rings or annular members 5 of the desired width without in any way damaging the lining. It will be understood that the depth of the groove 4 in the coupling, the wall thickness of the ring or annular member 5 and the thickness of lining are correlated so that the lining extends the same distance into the interior of the coupling 2 as the lining 11 of the pipes to be joined. That is to say, the inner diameter of the ring or annular member 5 is substantially equal to the interior diameter of the pipes to be connected. After the annular members 5 are severed from the length of pipe 7, it will be understood that they are then angularly cut so as to be split as at 6, as shown in Figure 4.

In joining the pipes together by means of such a coupling, a suitable metallic bonding medium is deposited on the ends of the pipes or on the inner surfaces of the coupling or both, and the coupling is preferably heated sufficiently so as to cause it to slightly expand and to liquify the bonding medium therein, if used, and if the bonding medium is deposited on the end of the pipes, it is preferable that the ends of the pipes be heated sufficiently to bring the bonding medium thereon to a molten state. The ends of the pipes are then positioned in the coupling and preferably slightly rotated relative to each other, particularly if the metallic bonding medium has been applied to only one of the members, that is, the ends of the pipes, and the ends of the pipes are positioned so that they abut against the annular or ring member therein, as shown in Figure 6. It will be understood that the coupling contracts upon cooling and no further heating of the joint is required, and upon cooling it has been found that a joint approaching the tensile strength of the members joined will have been provided.

As a result of my invention, it will be seen that a threadless joint has been provided which presents a smooth continuous inner wall or surface having substantially the same inner diameter throughout the joint. It will be noted, primarily due to the small clearance involved, that the metallic bonding medium will be drawn by capillary attraction around the split ring member 5 securely bonding it to the coupling and to the ends of the pipes, thereby preventing access of the fluid being transported in the pipes to the ferrous metal of the pipes and coupling.

While I have shown and described a specific embodiment of the present invention, it will be seen that I do not wish to be limited exactly thereto, since various modifications may be made without departing from the scope of the invention, as defined by the following claim.

I claim:

A threadless pipe connection for metallic lined pipes comprising a coupling member having an annular groove arranged around its inner wall substantially centrally thereof and a lined split resilient ring member having an inner diameter substatntially equal to that of the lined pipes to be joined arranged in the annular groove in said coupling member thereby providing a shoulder therein with the ends of said pipes being securely positioned in said coupling and abutting the ring member therein so as to provide a continuous lined inner wall throughout the joint having substantially the same inner diameter throughout the connection.

BOLTON C. MOISE.